H. GREBE.
Hay-Gatherer.
No. 217,609. Patented July 15, 1879.
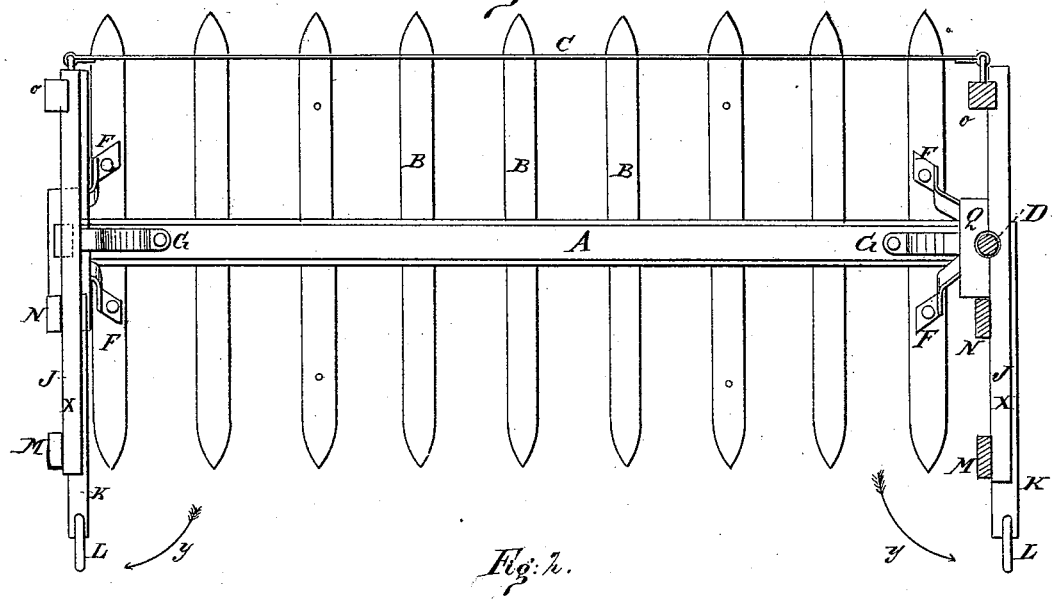
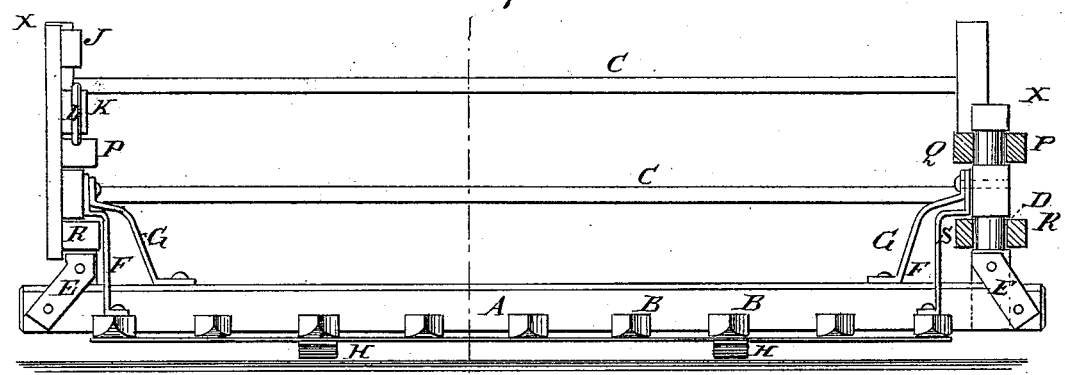
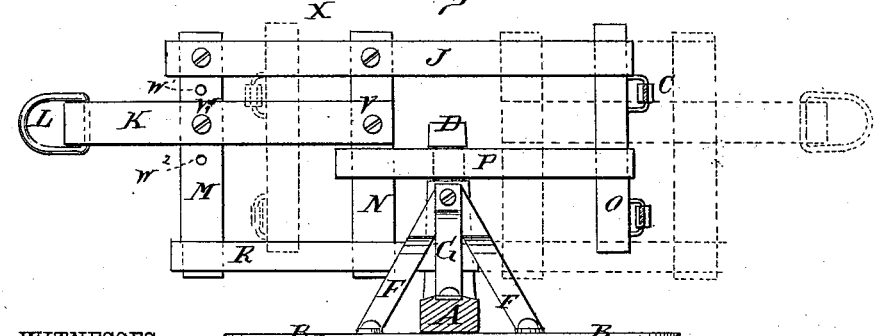
WITNESSES:
Chas. Nida
C. Sedgwick
INVENTOR:
H. Grebe
BY Munn & Co.
ATTORNEYS.

UNITED STATES PATENT OFFICE.

HENRY GREBE, OF OMAHA, NEBRASKA.

IMPROVEMENT IN HAY-GATHERERS.

Specification forming part of Letters Patent No. 217,609, dated July 15, 1879; application filed May 13, 1879.

*To all whom it may concern:*

Be it known that I, HENRY GREBE, of Omaha, in the county of Douglas and State of Nebraska, have invented a new and Improved Hay-Gatherer, of which the following is a specification.

The object of my invention is to provide a hay or straw gatherer that will collect the hay or straw and discharge it without requiring any handling of the same with forks.

The invention consists in the arrangement of a rake of proper size, provided at each end with a gate, that is pivoted on a post and connected by means of iron bands, ropes, leather belts, or some suitable means, so that when the sweep has arrived at its destination the gates can be swung around on their pivots and the hay or straw pushed off.

In the drawings, Figure 1 is a plan view. Fig. 2 is a front elevation. Fig. 3 is a vertical cross-section, showing how the gates can be swung.

Similar letters of reference indicate corresponding parts.

A is the main beam of the sweep, and to it the teeth B are fastened. The teeth are of wood, and about five feet and seven inches long. They are either mortised into A or filling-blocks are nailed in between them. A strip of iron or steel is secured to the under side of the beam to protect the same and the place where the teeth are joined to it.

H H are iron-clad shoes, fixed to the under side of the sweep, to insure easier and gentler motion.

At each end of the beam A, a standard, D, is mortised into it. On these uprights the gates X X are centrally or nearly centrally pivoted. This standard is properly braced and secured by the braces E, F, and G. The gates have two bearings on the standards D D, one at the top and one near the bottom.

The gate is constructed in the following manmen: M, N, and O are the three uprights. On top they are connected by the bar J. The bars P and Q clasp the upper end of the standard, and R S clasp the lower end, thus giving the gate a firm and secure bearing, but allowing the same to be turned. The lower bearing, formed by R and S, is cut off close to the standard, so that it does not strike the braces F and G when rotating.

K K are the draft-bars, and are secured to the uprights N by a bolt, V, and to M by a bolt, W. They can be raised or lowered and adjusted on M, as may be necessary, by means of the bolt W and holes $W^1$ and $W^2$.

L is the clevis to which the single-tree is hooked. The gates are connected by the belts or straps C C. These belts may be either of metal, leather, rope, or any other suitable material, and are fastened to the uprights O O by staples or some other suitable device.

The operation is as follows: The draft-bars K are adjusted as may be necessary, the horses hitched to L, and the sweep drawn forward. It will slide gently on the shoes H H, and the teeth will collect all the hay, straw, and like material. The hay, &c., cannot slide off the sweep, for the belts C C, of which there may be two or more, will prevent this. When the sweep arrives at the stack, barn, or wherever it is desired that the hay, &c., shall be deposited, the horses are turned in the direction of the arrows $y\ y$. As the gate is almost centrally pivoted on the standards D D, the ends to which the belts are fastened will near each other, and, in swinging around, will draw the belts across the sweep and push all the hay off.

Fig. 3 shows the different positions that the gates assume.

Hay, straw, and all like material can thus be conveniently and rapidly transported. There is no necessity of handling the hay with forks or throwing it about.

The sweep can be made any size, of any hard timber. In proportion to its size it is light, and is very durable and practicable.

Having thus described my invention, I claim as new and desire to secure by Letters Patent—

A hay-sweep having a rake provided with two centrally, or nearly centrally, pivoted gates, and extending nearly across the entire sweep, connected by bands, straps, or ropes, as and for the purpose set forth.

HENRY GREBE.

Witnesses:
WM. H. IJAMS,
GEO. H. GUY.